(12) United States Patent
Kreplin et al.

(10) Patent No.: US 12,296,677 B2
(45) Date of Patent: May 13, 2025

(54) SYSTEM, METHOD AND SOFTWARE FOR DISPLAYING A DISTANCE MARKING

(71) Applicant: Bayerische Motoren Werke Aktiengesellschaft, Munich (DE)

(72) Inventors: Marian Kreplin, Grafing (DE); Tobias Riesenweber, Vierkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/298,772

(22) Filed: Apr. 11, 2023

(65) Prior Publication Data

US 2023/0339324 A1    Oct. 26, 2023

(30) Foreign Application Priority Data

Apr. 20, 2022    (DE) ............ 10 2022 109 576.2

(51) Int. Cl.
| | | |
|---|---|---|
| *B60K 35/00* | (2024.01) | |
| *B60W 30/16* | (2020.01) | |
| *B60W 40/09* | (2012.01) | |
| *B60K 35/22* | (2024.01) | |
| *B60K 35/28* | (2024.01) | |

(52) U.S. Cl.
CPC ............ *B60K 35/00* (2013.01); *B60W 30/16* (2013.01); *B60W 40/09* (2013.01); *B60K 35/22* (2024.01); *B60K 35/28* (2024.01); *B60K 2360/176* (2024.01); *B60K 2360/177* (2024.01); *B60K 2360/179* (2024.01); *B60W 2554/80* (2020.02)

(58) Field of Classification Search
None
See application file for complete search history.

(56) References Cited

U.S. PATENT DOCUMENTS

| | | | | |
|---|---|---|---|---|
| 2002/0055808 A1* | 5/2002 | Matsumoto | .......... | G01C 21/365 |
| | | | | 348/148 |
| 2013/0190944 A1* | 7/2013 | Brandin | ................ | G01C 21/26 |
| | | | | 701/1 |

(Continued)

FOREIGN PATENT DOCUMENTS

| | | |
|---|---|---|
| CN | 109285372 A | 1/2019 |
| CN | 113962011 A | 1/2022 |

(Continued)

OTHER PUBLICATIONS

German Search Report issued in German application No. 10 2022 109 576.2 dated Jan. 30, 2023, with Statement of Relevancy (Ten (10) pages).

(Continued)

*Primary Examiner* — David P. Merlino
(74) *Attorney, Agent, or Firm* — Crowell & Moring LLP

(57) ABSTRACT

The invention relates to a system for displaying a distance marking for the driver of a motor vehicle, which is set up to receive speed information relating to the speed of the motor vehicle. Depending on the speed information, a safety distance of the motor vehicle relative to vehicles driving ahead is determined, depending on the determined safety distance, image information for displaying a distance marking is generated, and based on the image information a distance marking is displayed at a distance from the motor vehicle in the traffic situation ahead by means of a display device.

18 Claims, 3 Drawing Sheets

(56) References Cited

U.S. PATENT DOCUMENTS

| | | | | |
|---|---|---|---|---|
| 2018/0198955 | A1* | 7/2018 | Watanabe | G09G 3/001 |
| 2018/0218713 | A1* | 8/2018 | Kusanagi | B60Q 9/008 |
| 2019/0251373 | A1 | 8/2019 | Lee et al. | |
| 2019/0294895 | A1* | 9/2019 | Kleen | G02B 27/0101 |
| 2022/0135062 | A1* | 5/2022 | Seitz | G06V 20/588 |
| | | | | 701/23 |
| 2022/0161657 | A1* | 5/2022 | Seitz | G06T 13/80 |
| 2024/0400082 | A1* | 12/2024 | Kunze | B60K 35/10 |

FOREIGN PATENT DOCUMENTS

| | | |
|---|---|---|
| DE | 103 54 641 A1 | 6/2005 |
| DE | 10 2011 121 763 A1 | 6/2013 |
| DE | 10 2012 208 188 A1 | 11/2013 |
| DE | 102013016242 A1 | 4/2015 |
| DE | 10 2017 221 191 B4 | 5/2019 |
| DE | 10 2019 202 586 A1 | 8/2020 |
| EP | 1878605 A2 | 1/2008 |
| GB | 2 419 118 A | 4/2006 |
| JP | H0777421 A | 3/1995 |
| JP | 2006309552 A | 11/2006 |
| JP | 2021-51007 A | 4/2021 |
| KR | 20140118114 A | 10/2014 |
| WO | WO-2011067170 A1 * 6/2011 ............. G02B 27/01 |

OTHER PUBLICATIONS

German-language German Office Action issued in German application No. 10 2022 109 576.2 dated Feb. 16, 2023 (Seven (7) pages).

Office Action issued in Chinese Patent Application No. 202310413685.1 dated Mar. 25, 2025 w/English translation, 19 pages.

* cited by examiner

SYSTEM, METHOD AND SOFTWARE FOR DISPLAYING A DISTANCE MARKING

CROSS REFERENCE TO RELATED APPLICATION

This application claims priority under 35 U.S.C. § 119 from German Patent Application No. 102022109576.2, filed Apr. 20, 2022, the entire disclosure of which is herein expressly incorporated by reference.

BACKGROUND AND SUMMARY

The invention relates to a system, method and software for displaying a distance marking for the driver of a motor vehicle, in particular of a passenger car.

It is often difficult for the driver of a motor vehicle to maintain a recommended safety distance to road users driving ahead, for example because the driver does not correctly estimate the distance to the vehicle driving ahead. This poses the risk of rear-end collisions in the event that a vehicle driving ahead brakes suddenly.

It is an object of the invention to provide support for the driver that makes it easier for the driver to maintain the safety distance to vehicles driving ahead.

The object is achieved by the features of the independent claims. Advantageous embodiments are described in the dependent claims. It should be noted that additional features of a claim dependent on an independent claim, without the features of the independent claim, or only in combination with a subset of the features of the independent claim, may constitute a separate invention which is independent of the combination of all the features of the independent claim and which can be made the subject of an independent claim, divisional application or subsequent application. The same applies to technical teachings described in the description, which may constitute an invention independent of the features of the independent claims.

A first aspect of the invention relates to a system for displaying a distance marking for the driver of a motor vehicle, in particular a distance line. The system is set up to perform various activities described below. This is typically done by means of one or more software-controlled devices, in particular electronic control units. Each of the one or more software-controlled devices may comprise one or more programmable processors which operate under program control in the manner according to the invention by means of one or more software programs.

The system is set up to receive speed information regarding the speed of the motor vehicle, i.e. typically the current actual vehicle speed.

Depending on the speed information, a safety distance of the motor vehicle relative to vehicles driving ahead is determined. For example, the safety distance is calculated according to the rule of thumb distance equal to half the speedometer reading. It may be provided that a fixed safety distance independent of the vehicle speed is used within built-up areas, for example 15 m.

Depending on the determined safety distance, image information is generated for displaying a distance marking, wherein based on the image information, a distance marking is displayed from the driver's point of view at a distance from the motor vehicle in the traffic situation ahead by means of a display device.

The displayed distance marking helps the driver to estimate the distance to the vehicle driving ahead so that the driver does not drive too close to the vehicle driving ahead.

The display of the distance marking is preferably intended for manual operation of the vehicle without automated longitudinal guidance when the driver sets the driving speed by depressing the accelerator pedal. However, it would also be conceivable to display the distance marking in automated driving with at least automated longitudinal guidance (for example according to SAE level 1, 2 or 3) in order to signal to the driver that the safety distance is maintained.

The distance marking can be part of an AR (augmented reality) visualization, which includes further information in addition to the distance marking.

According to a first embodiment of the invention, a head-up display can be used as a display device, wherein based on the image information a distance marking is projected into the driver's field of view by means of the head-up display.

According to an alternative second embodiment of the invention, a screen arranged in the vehicle cockpit can be used as a display device, wherein an updated image of the traffic situation ahead is continuously generated by means of a video camera. Alternatively, a VR headset (VR—virtual reality) can be used. Based on the image of the traffic situation ahead and the image information for displaying the distance marking, a distance marking is displayed in the image of the traffic situation ahead on the screen. Preferably, two video streams (video signals) are generated in the second embodiment, namely a first video stream with the image of the traffic situation ahead and a second video stream with the image information for displaying the distance marking and a transparent background (if appropriate with further image information of an AR visualization, for example an object marking of a vehicle driving ahead). These video streams are then overlaid and the overlaid video signal is then displayed on the screen.

In a third embodiment of the invention, AR glasses can also be used as a display device.

It is advantageous if the distance marking is a distance line, preferably having a certain depth from the driver's point of view, and preferably at the level of the road from the driver's point of view (either in the video image of the road in the case of the use of a screen or on the real road in the case of the use of a head-up display or AR glasses).

For example, the distance line has a shadow and becomes increasingly transparent towards the sides.

It is generally advantageous to use a 3D environment model of the environment of the motor vehicle for the invention, wherein in the 3D environment model a distance object assigned to the distance marking is integrated positionally correctly for a position of the motor vehicle assumed in the 3D environment model. For example, the distance object is a two-dimensional graphic object located at ground level in the 3D environment model. The calculated 3D environment model can then be subjected to a 2D projection (i.e. a projection onto a 2D image plane by "virtual" filming of the 3D scene) to generate the image information for displaying a distance marking. The 2D projection can, for example in the case of the second embodiment of the invention (display of the video image and the distance marking on a screen in the vehicle cockpit) be displayed from the assumed perspective of the video camera, or in the case of the first embodiment of the invention (display of the distance marking on a head-up display) can be displayed from an assumed perspective of the driver. The result of the 2D projection, for example, corresponds directly to the image information for displaying the distance information. Alternatively, the result of the 2D projection can be subjected to further signal processing.

Obscuring of the distance line by vehicles driving ahead should preferably be ensured for better distance estimation. For this purpose, position information relating to the position of a vehicle driving ahead of the motor vehicle can be determined by means of an environment sensor system (for example front radar and/or front camera), for example the distance and direction angle to a vehicle driving ahead. Depending on the position information, image information is generated for displaying the distance line such that the distance line is completely or partially obscured by the vehicle driving ahead. From the driver's point of view, the displayed distance line is therefore obscured along the entire length or part of its length by the vehicle driving ahead (in the video image or in the real image with a head-up display/AR glasses).

For example, the distance line is obscured in such a way that it is not present at a position of the vehicle driving ahead or its visibility is at least reduced. In addition, the distance line can also be obscured by vehicles driving ahead if the vehicles driving ahead are located in front of the distance line from the point of view of the subject vehicle.

Preferably, the distance line extends laterally beyond the width of a vehicle driving ahead (in the video image or in the real image), in particular on both sides of the vehicle driving ahead, wherein the distance line in the area of the vehicle driving ahead is interrupted or its visibility is at least reduced (for example is displayed transparently).

If a 3D environment model as described above is used, a 3D model of the vehicle driving ahead can also be positioned correctly for a position of the motor vehicle assumed in the 3D environment model according to the position information to implement the obscuring of the distance line by a vehicle driving ahead in the 3D environment model. The 3D model of the vehicle, for example, is a cuboid that is placed in the 3D model according to the detected position of the vehicle driving ahead.

In the 2D projection of the 3D environment model described above, the distance line is then partially or completely obscured by the vehicle driving ahead, provided that the vehicle driving ahead is located in a position causing the obscuring. Obscuring can take place, for example, if the distance object assigned to the distance line or a part thereof is located under or within the 3D model, or behind the 3D model.

Following the 2D projection, in the result of the 2D projection, preferably the image parts belonging to a vehicle driving ahead (originating from the projection of the 3D model) are removed, in particular by making these image parts transparent. The part of the distance line obscured by the 3D models also becomes transparent as a result and is therefore not visible to the driver in the displayed image.

An image of the traffic situation ahead can be generated by means of the video camera, and the image of the traffic situation ahead can be subjected to a semantic image segmentation in order to determine image portions of a vehicle driving ahead. Based on the determined image portions, the image information for displaying the distance marking can be generated. By using semantic image segmentation, the obscuring of the distance line by a vehicle driving ahead can be represented more realistically, for example by interrupting the distance line according to the exact contour of the vehicle driving ahead. For example, based on the determined image portions of a vehicle driving ahead, a detailed 3D model deviating from a simple cuboid can be generated, so that the obscuring takes place as far as possible without disturbing artifacts.

It is advantageous if the distance marking moves depending on the direction of travel predetermined by the steering in order to indicate the direction of travel to the driver. For this purpose, a variable that is characteristic of the direction of travel, in particular the curvature of the trajectory of the motor vehicle, is used to generate, depending on this, image information for displaying the distance marking such that the displayed distance marking moves horizontally in the event of a change of the direction of travel for the purpose of displaying the current direction of travel.

In this case, it is advantageous to determine a circle of curvature or a part (i.e. an arc) of a circle of curvature of the trajectory depending on the variable that is characteristic of the direction of travel, in particular a curvature of the trajectory. For this purpose, for example, a radius of curvature is first determined from the curvature. Depending on the circle of curvature or the circle of curvature arc and the determined safety distance, a horizontal position for the distance marking is then determined. This results, for example, from the intersection between the circle of curvature or circle of curvature arc and the safety distance (possibly shifted by an offset).

If a 3D environment model is used, depending on the variable that is characteristic of the direction of travel in the 3D environment model, a direction of travel object assigned to the direction of travel, in particular a circle of curvature or a part of a circle of curvature, can be correctly positioned for the position of the motor vehicle assumed in the 3D environment model. The direction of travel object is placed in the 3D environment object preferably at ground level. The distance object is placed in the 3D environment model depending on the position of the circle of curvature or the circle of curvature arc, preferably on the circle of curvature or the arc.

The distance object is preferably placed at that position of the direction of travel object which is at the safety distance or the safety distance shifted by an offset from the position assumed in the 3D environment model along the circular path of the circle of curvature.

The use of an offset may be necessary if the safety distance is determined relative to the front of the vehicle, but in the 3D environment model the reference point for the position of the vehicle is in the middle of the rear axle (the offset then corresponds to the distance between the rear axle and the front of the vehicle).

In other words, a circle of curvature or circle of curvature arc is preferably placed on the floor of the 3D environment model. In the 3D environment model, the center of the distance line can then be placed on the circle of curvature at the safety distance (possibly shifted by an offset) when viewed from the vehicle position.

It may be provided to determine the distance to a vehicle driving ahead by means of an environment sensor system, and if the determined distance to a vehicle driving ahead is less than, or less than or equal to, a threshold value, to display the distance marking in a highlighted representation, in particular highlighted in color (for example, red). The determined safety distance or a variable that is dependent on the safety distance, for example 90% of the safety distance, is suitable as a threshold value, for example. Different threshold values can be used, each with a different highlighting of the distance marking, for example a distance less than the safety distance causes a yellow distance marking. and a distance less than 90% of the safety distance causes a red distance marking.

Instead of a distance marking, in particular a distance line, a vehicle driving ahead could also be colored, for example yellow or red, if the distance falls below a distance threshold.

It is also advantageous to use adaptive cruise control presetting information by means of driver presetting of the distance of an adaptive cruise control (also called an ACC system) integrated in the motor vehicle to calculate the safety distance. For example, the driver can preset one of the three default settings "large distance", "medium distance" or "small distance" to vehicles driving ahead for the adaptive cruise control, so that the adaptive cruise control adjusts the distance to the vehicle driving ahead depending on the selected presetting. This presetting of the adaptive cruise control can also be used for the display system according to the invention and the display of the distance marking can also be influenced according to the presetting of the adaptive cruise control, for example display of the distance marking at a distance of 80% of the calculated safety distance with ACC preset "small distance", display of the distance marking at a distance of 100% of the calculated safety distance with ACC preset "medium distance", display of the distance marking at a distance of 120% of the calculated safety distance with ACC preset "large distance."

The adjustment of the displayed safety distance depending on the ACC presetting is based on the consideration that a driver who prefers a large, small or medium distance to the vehicle driving ahead in the ACC driving mode also prefers a large, small or medium distance in the manual driving mode, so that the display of the distance marking for the manual driving mode should be adapted accordingly.

However, it would also be conceivable to use driver information relating to the previous braking behavior of the driver in order to determine the safety distance of the motor vehicle relative to vehicles driving ahead depending on the driver information. The braking behavior concerns, for example, the driver-related reaction time after braking of the vehicle driving ahead or the reaction time plus the braking time or only the reaction time after braking of the vehicle driving ahead. It is advantageous to determine the previous braking behavior over a large number of trips by the same driver, wherein the driver is identified by a corresponding driver identification A second aspect of the invention relates to a method for displaying a distance marking for the driver of a motor vehicle, with the steps: receiving speed information concerning the speed of the motor vehicle; determining a safe distance of the motor vehicle relative to vehicles driving ahead as a function of the speed information; and generating image information for displaying a distance marking depending on the determined safety distance, and based on the image information, displaying a distance marking from the driver's point of view at a distance from the motor vehicle in the traffic situation ahead by means of a display device.

The above statements about the system according to the invention according to the first aspect of the invention apply in a corresponding manner to the method according to the invention according to the second aspect of the invention. Advantageous exemplary embodiments of the method according to the invention not explicitly described at this point and in the claims correspond to the advantageous embodiments of the system according to the invention described above or described in the claims.

A third aspect of the invention relates to software with program code for carrying out the method according to the second aspect of the invention, when the software is running on one or more software-controlled devices. A software-controlled device preferably comprises one or more programmable processors that process the program code of the software loaded into a memory.

Furthermore, the invention relates to a computer-readable (memory) medium, comprising commands which, when executed by a software-controlled device, cause it to carry out the method according to the invention.

The invention is described below based on an exemplary embodiment using the attached drawings. Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
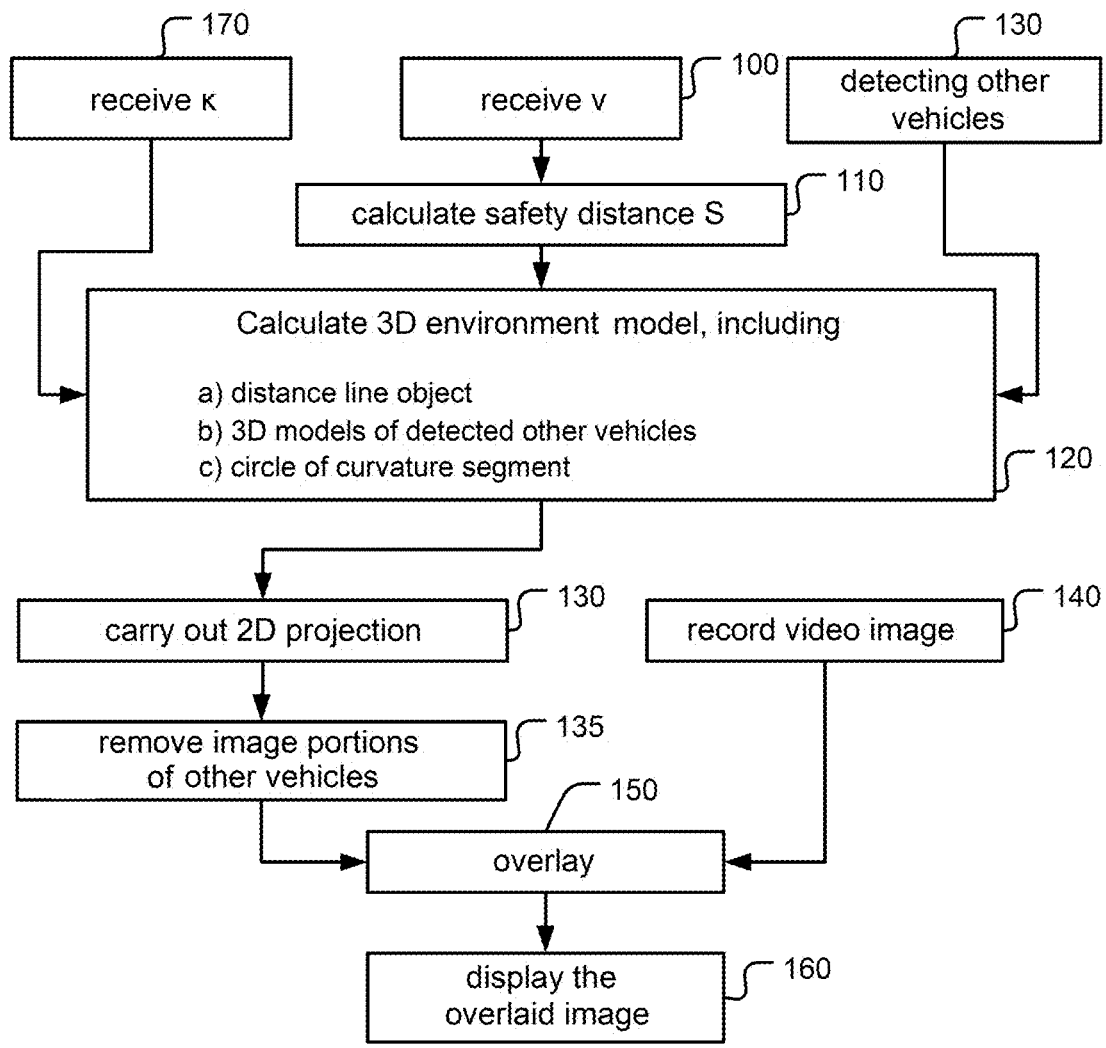
FIG. 1 shows an exemplary flowchart for the function of an exemplary embodiment of a system for displaying a distance line.

The above described drawing figures illustrate the present invention in at least one embodiment, which is further defined in detail in the following description. Those having ordinary skill in the art may be able to make alterations and modifications to what is described herein without departing from its spirit and scope. While the present invention is susceptible of embodiment in many different forms, there is shown in the drawings and will herein be described in detail at least one preferred embodiment of the invention with the understanding that the present disclosure is to be considered as an exemplification of the principles of the present invention, and is not intended to limit the broad aspects of the present invention to any embodiment illustrated.

In accordance with the practices of persons skilled in the art, the invention is described below with reference to operations that are performed by a computer system or a like electronic system, particularly that of a motor vehicle. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, code segments perform certain tasks described herein. The code segments can be stored in a processor readable medium. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

In the following detailed description and corresponding figures, numerous specific details are set forth in order to provide a thorough understanding of the present invention. However, it should be appreciated that the invention may be practiced without such specific details. Additionally, well-known methods, procedures, components, and circuits have not been described in detail.

FIG. 1 shows an exemplary flowchart describing the function of an exemplary embodiment for a display system according to the invention for displaying a distance line. In the exemplary embodiment, it is assumed that the video image of the traffic situation ahead is overlaid with the image of a distance line and the resulting video image is displayed on a screen in the vehicle cockpit (for example an instrument cluster).

In step 100, the current vehicle speed v determined by a sensor system of the vehicle is received by the display system, and based on the vehicle speed v, a safety distance S is calculated in step 110, which is to be maintained relative to vehicles driving ahead. The safety distance S indicates the distance to be maintained from the front of the subject vehicle to the rear of vehicles driving ahead. For example, the safety distance S is calculated according to the rule of thumb distance equal to half the speedometer reading. In built-up areas, a fixed safety distance S that is independent of the vehicle speed is used, for example 15 m. In step 120, a 3D environment model of the environment of the subject vehicle is calculated, wherein based on the calculated safety distance S a distance line-object 200 is positioned correctly in the 3D environment model for a position of the vehicle assumed in the 3D environment model.

Figure 2:
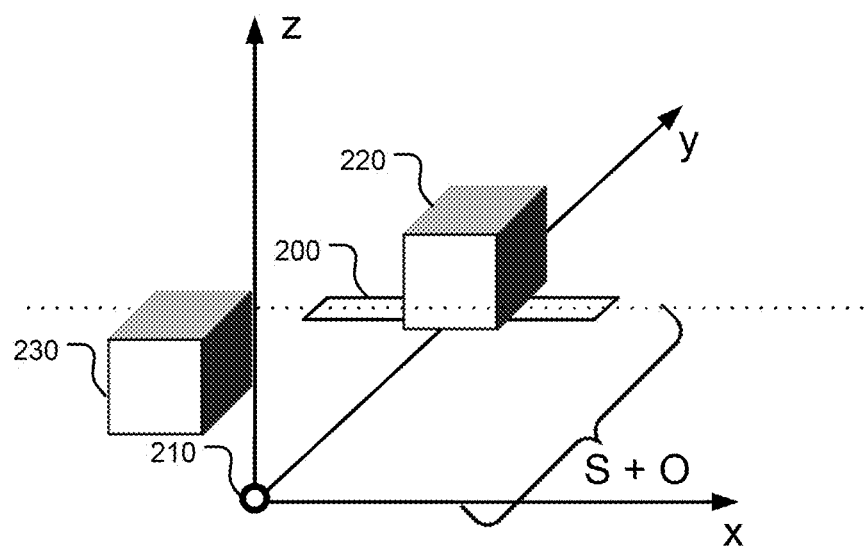
FIGS. 2 and 4 show an exemplary 3D environment model.

Such a 3D environment model with three spatial axes x (vehicle transverse axis), y (vehicle longitudinal axis), z (vehicle vertical axis) is shown in FIG. 2. The origin (reference point) 210 of the 3D environment model corresponds to the position of the subject vehicle, namely the position of the center of the rear axle at the distance O (for example 4 m) from the front of the vehicle.

The distance line object 200 is placed orthogonally to the y-axis and parallel to the x-axis as a two-dimensional graphic object with a predetermined length and width at ground level in the 3D environment model.

Figure 4:
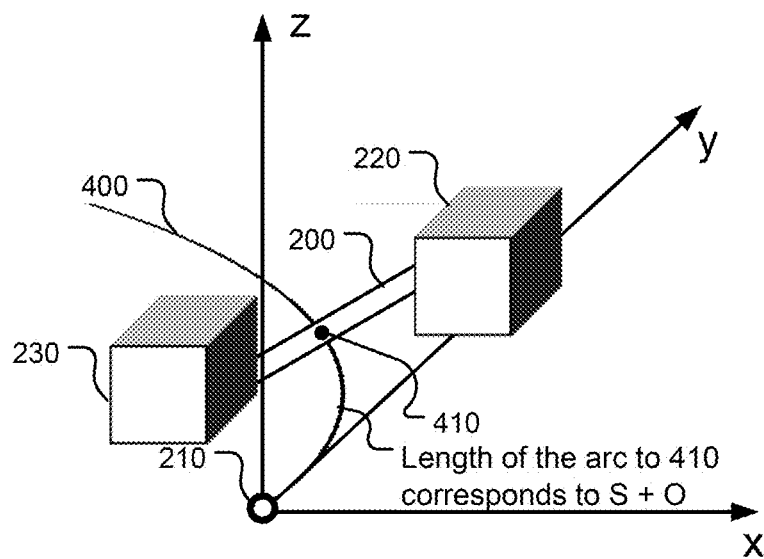
Figure 5:
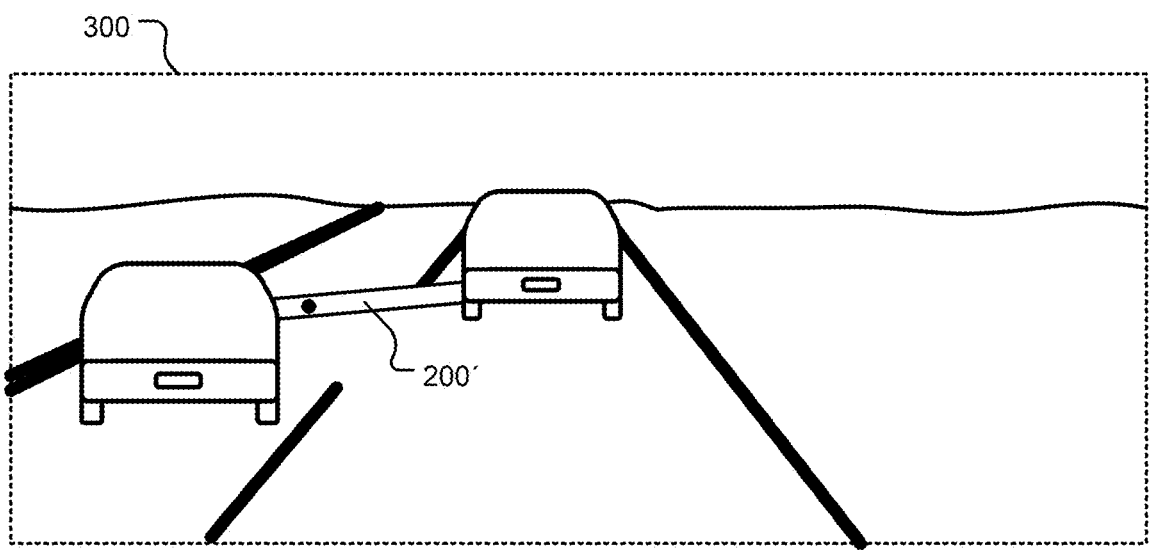

If the trajectory of the vehicle is not curved (i.e. zero steering angle deflection), the distance line object 200 is located at a distance S+O from the vehicle position 210 in the direction of the vehicle's longitudinal axis y (if there is steering, reference is made to FIGS. 4 and 5 and the explanatory description). The distance S+O in this example is related to the center in the y-direction of the two-dimensional graphic object (alternatively, of course, this could also be related to another reference of the two-dimensional graphic object).

Furthermore, in FIG. 1 in step 130, other vehicles driving ahead around the environment of the subject motor vehicle are detected by means of a suitable environment sensor system (for example camera sensors). Based on this, in the 3D environment model shown in FIG. 2, 3D models 220, 230 of vehicles driving ahead are positioned correctly for the position of the motor vehicle according to the position information. In this example, the 3D models 220, 230 of the vehicles are simple cuboids that are placed in the 3D model according to the detected position of the vehicle driving ahead. The dimensions of the rear sides of the 3D models 220, 230 facing the vehicle preferably correspond to the respective detected height and width of the vehicles driving ahead. A fixed value (for example 5 meters) can be used for the length of the 3D model, or a value adapted to the detected vehicle type can be used based on the recognition of a particular vehicle type (for example passenger cars or trucks).

The calculated 3D environment model with the distance line object 200 placed at the correct distance and the 3D models 220, 230 of detected vehicles driving ahead is then subjected to a 2D projection in step 130. In this case, the distance line object 200 is partially or completely obscured by a 3D model of a vehicle driving ahead if the distance line object 200 is located under the vehicle driving ahead (see FIG. 3) or behind the vehicle driving ahead (see the left vehicle in FIG. 5) from the point of view of the front camera (or the driver in the case of a head-up display).

In this example, the 2D projection is carried out from the assumed perspective of a front video camera continuously recording the traffic situation ahead in step 140. The 3D environment model is continuously updated based on the changed traffic situation ahead and the current vehicle speed v, so that the image of the 2D projection is also continuously updated.

In step 135, the image parts belonging to the vehicle driving ahead (originating from the projection of the 3D model) are removed from the result of the 2D projection by making these image parts transparent. The part of the distance line obscured by the 3D models 220, 230 also becomes transparent as a result and is therefore not visible to the driver in the displayed image.

The video stream of the 2D projection and the video stream of the front video camera are overlaid in step 150.

Figure 3:
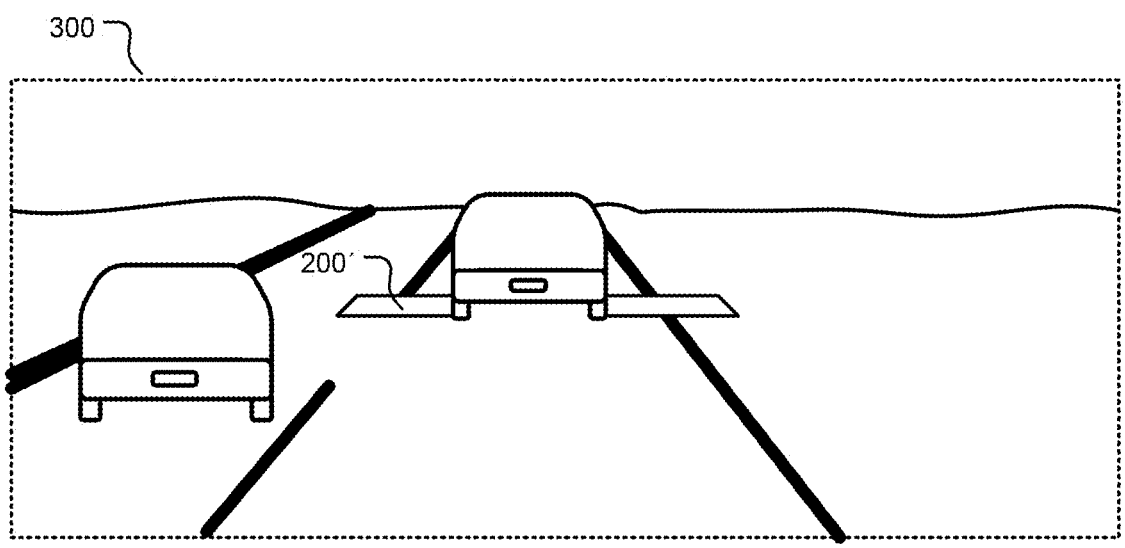
FIGS. 3 and 5 show an exemplary video display.

In FIG. 3, the resulting video image 300 is shown, which is displayed on the screen in step 160. As can be seen from FIG. 3, the displayed distance line 200 is obscured by the vehicle driving ahead over part of its length. The distance line 200 extends laterally beyond the width of a vehicle driving ahead and is interrupted in the area of the vehicle driving ahead. The distance line 200 has a certain depth and becomes increasingly transparent (not shown), preferably towards the sides. The distance line 200 preferably also has a shadow.

Furthermore, in the exemplary embodiment in FIG. 1 it is provided that the displayed distance marking moves horizontally when the steering angle is changing and thus when the direction of travel is changing (if appropriate also slightly horizontally). For this purpose, the current curvature κ of the trajectory of the subject vehicle is received in step 170 and used to place the circle of curvature (with the radius 1/κ) or a part (i.e. arc) thereof positionally correctly in the 3D environment model. Such a circle of curvature arc 400 is shown in FIG. 4. The circle of curvature arc 400 is placed in the 3D environment object at ground level. The center 410 of the distance line object 200 is then placed in the 3D environment model on the circle of curvature object 400 in the direction of the x-axis at the position of the circle of curvature arc 400 at a distance S+O from the position of the motor vehicle along the circle of curvature assumed in the 3D environment model. The distance S+O is thus measured along the circular path. Here, the distance line object 200 is placed orthogonally to the line of the circle of curvature arc 400.

In the resulting video image 300 in FIG. 5, the distance line 200 has moved horizontally in the direction of travel set by means of the steering compared to the video image 300 in FIG. 3. To clarify the operating principle, the center of the distance line 210' in the horizontal direction is marked by the point 410 in FIG. 5, which corresponds to the point 410 in the 3D environment model.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The embodiments described in detail above are considered novel over the prior art and are considered critical to the operation of at least one aspect of the described systems, methods and/or apparatuses, and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus, if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for any one of the elements described and its various embodiments or that a single element may be substituted for two or more elements.

Changes from the subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

Furthermore, the functionalities described herein may be implemented via hardware, software, firmware or any combination thereof, unless expressly indicated otherwise. If implemented in software, the functionalities may be stored in a memory as one or more instructions on a computer readable medium, including any available media accessible by a computer that can be used to store desired program code in the form of instructions, data structures or the like. Thus, certain aspects may comprise a computer program product for performing the operations presented herein, such computer program product comprising a computer readable medium having instructions stored thereon, the instructions being executable by one or more processors to perform the operations described herein. It will be appreciated that software or instructions may also be transmitted over a transmission medium as is known in the art. Further, modules and/or other appropriate means for performing the operations described herein may be utilized in implementing the functionalities described herein.

What is claimed is:

1. A system for displaying a distance marking for a driver of a motor vehicle which is set up:
   to receive speed information relating to a speed of the motor vehicle,
   to determine a safety distance of the motor vehicle relative to a vehicle driving ahead as a function of the speed information,
   to generate image information to display the distance marking as a function of the determined safety distance and based on the image information to display the distance marking at a distance from the motor vehicle in a traffic situation ahead,
   wherein the system is set up:
   using the determined safety distance, to calculate a 3D environment model of an environment of the motor vehicle, which has a distance object associated with the distance marking at a distance from a position of the motor vehicle in the 3D environment model, and
   to carry out a 2D projection based on the calculated 3D environment model to generate the image information to display the distance marking.

2. The system according to claim 1, wherein the system comprises a head-up display as a display device, and the system is set up to project the distance marking in a field of view of the driver by means of the head-up display based on the image information.

3. The system according to claim 1, wherein the system comprises a screen as a display device and a video camera, and the system is set up:
   to generate an image of the traffic situation ahead by means of the video camera,
   based on the image of the traffic situation ahead and the image information for displaying the distance marking, to display the distance marking in the image of the traffic situation ahead on the screen.

4. The system according to claim 1, wherein the distance object is a distance object located at ground level.

5. The system according to claim 1, wherein the distance marking is a distance line.

6. The system according to claim 5, wherein the system is set up:
   to determine position information relating to a position of the vehicle driving ahead of the motor vehicle by means of an environment sensor system,
   depending on the position information, to generate the image information for displaying the distance line such that the displayed distance line is obscured by the vehicle driving ahead over its entire length or part of its length.

7. The system according to claim 6, wherein the distance line extends laterally beyond the width of the vehicle driving ahead and is interrupted in an area of the vehicle driving ahead or is at least reduced in its visibility.

8. The system according to claim 1,
   wherein the system is set up to further provide in the 3D environment model a 3D model of the vehicle driving ahead, which is positionally correct relative to the position of the motor vehicle in the 3D environment model, and
   wherein in the 2D projection the distance marking is partially or completely obscured by the vehicle driving ahead, if in the 3D environment model the distance object or a part thereof is located below or within the 3D model or behind the 3D model.

9. The system according to claim 8, wherein the system is set up:
   in the result of the 2D projection to remove part of an image belonging to the vehicle driving ahead, in particular to make this part of the image transparent.

10. The system according to claim 6, wherein the system is set up:
    to generate an image of the traffic situation ahead by means of the video camera,
    to subject the image of the traffic situation ahead to a semantic image segmentation, in which image portions of the vehicle driving ahead are determined, and to generate the image information for displaying the distance marking based on the determined image portions.

11. The system according to claim 1, wherein the system is set up:
to receive a variable that is characteristic of a direction of travel of the motor vehicle, and
depending on the variable that is characteristic of the direction of travel, to generate image information for displaying the distance marking such that the displayed distance marking moves horizontally when the direction of travel is changing.

12. The system according to claim 11, wherein the system is set up:
to determine a trajectory of the motor vehicle depending on the variable that is characteristic of the direction of travel, and
depending on this and the determined safety distance, to determine a horizontal position for the distance marking and
depending on the horizontal position for the distance marking, to generate the image information for displaying the distance marking.

13. The system according to claim 1, wherein the system is set up:
depending on a variable that is characteristic of a direction of travel in the 3D environment model, to provide a direction of travel object assigned to the direction of travel that is positionally correct relative to the position of the motor vehicle in the 3D environment model, and
to place the distance object in the 3D environment model at a position of the direction of travel object that is at the safety distance or the safety distance shifted by an offset from the position of the motor vehicle in the 3D environment model.

14. The system according to claim 1, wherein the system is set up:
to determine a distance to the vehicle driving ahead by means of an environment sensor system,
provided that the distance determined to the vehicle driving ahead is less than, or less than or equal to, a threshold value, to generate the image information for displaying the distance marking such that the displayed distance marking is displayed in a highlighted manner.

15. The system according to claim 1, wherein the system is set up:
to receive adaptive cruise control presetting information about a presetting of a distance of an adaptive cruise control integrated in the motor vehicle, and
depending on the adaptive cruise control presetting information, to determine the safety distance of the motor vehicle relative to one or more vehicles driving ahead, including at least the vehicle driving ahead.

16. The system according to claim 1, wherein the system is set up:
to receive driver information concerning braking behavior, and
to determine the safety distance of the motor vehicle relative to one or more vehicles driving ahead depending on the driver information, wherein the one or more vehicles driving ahead includes the vehicle driving ahead.

17. A method for displaying a distance marking for a driver of a motor vehicle, including the steps:
receiving speed information relating to a speed of the motor vehicle;
determining a safety distance of the motor vehicle in relation to a vehicle traveling ahead as a function of the speed information; and
generating image information to display the distance marking as a function of the determined safety distance, and based on the image information displaying the distance marking at a distance from the motor vehicle in a traffic situation ahead by means of a display device,
wherein:
using the determined safety distance, a 3D environment model of an environment of the motor vehicle is calculated, which has a distance object associated with the distance marking at a distance from a position of the motor vehicle in the 3D environment model, and
based on the calculated 3D environment model, a 2D projection is carried out to generate the image information to display the distance marking.

18. A non-transitory computer readable medium storing software that configures one or more devices to carry out the method of claim 17.

* * * * *